Oct. 22, 1957    R. G. STERN ET AL    2,810,210
SIMULATED OIL COOLING SYSTEM FOR AIRCRAFT ENGINE
Filed June 14, 1954

INVENTORS
ROBERT G. STERN
JULIUS PORT
BY
their ATTORNEY

UnitedStates Patent Office 2,810,210
Patented Oct. 22, 1957

2,810,210

SIMULATED OIL COOLING SYSTEM FOR AIRCRAFT ENGINE

Robert G. Stern, West Caldwell, and Julius Port, Newark, N. J., assignors to Curtiss-Wright Corporation, a corporation of Delaware Application June 14, 1954, Serial No. 436,531

4 Claims. (Cl. 35—12)

This invention relates to aircraft trainers and more particularly to apparatus for simulating an oil cooling system for an aircraft engine.

Certain types of aircraft as for example aircraft having the Air Force designation C-119 are provided with an oil cooler of the type having an oil cooler flap which may be operated to regulate the flow of air through the cooler so as to maintain oil temperature in the engine within prescribed limits. The oil cooler flap is actuated by an electric motor according to the position of an oil cooler flap control switch as determined by the pilot. The oil cooler flap control switch may be disposed in any one of four positions, the switch positions being "off," "open," "close," and "automatic." With the oil cooler flap control switch in the "off" position, the electric motor for operating the oil cooler flap is inoperative so that the oil cooler flap is maintained in a fixed position, whereas when the oil cooler flap control switch is in the "open" position the motor is operated in a direction such that the oil cooler flap is opened to increase the flow of air through the cooler and thereby reduce oil temperature. Placing the oil cooler flap control switch in the "close" position causes the motor to close the oil cooler flap cutting off the flow of air through the cooler to increase oil temperature. With the oil cooler flap control switch in the "automatic" position, operation of the oil cooler flap is automatically controlled to maintain oil temperature in the engine at approximately 80° C.

It is desirable to provide prospective crews of aircraft of the foregoing type with training in the use of the described oil cooling apparatus, and this invention has as its prime object the provision of means for effectively simulating such an oil cooling system.

The invention will be more fully set forth in the following description referring to the accompanying drawings, and the features of novelty will be pointed out with particularity in the claims annexed to and forming a part of this specification.

Figure 1:
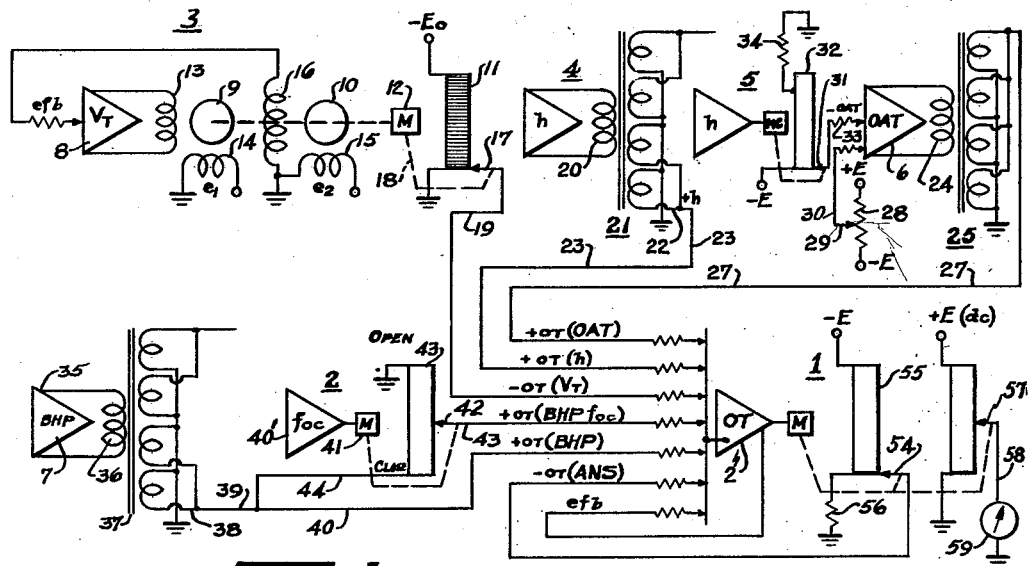
Figure 2:
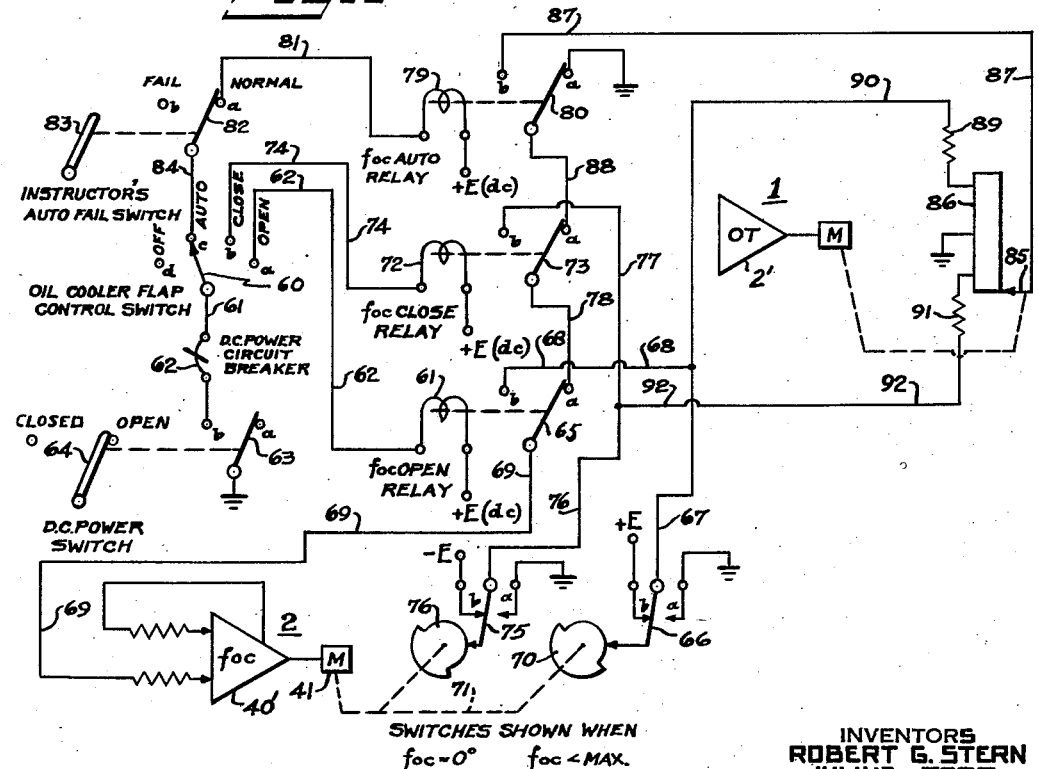

Referring to the drawings, Fig. 1 is a schematic illustration showing the manner in which the operation of an indicator for registering oil temperature is rendered dependent upon simulation of oil cooler flap position. Fig. 2 is a schematic illustration of apparatus for simulating control and operation of the oil cooler flap.

In Fig. 1, reference character 1 designates an oil temperature servo (OT) which functions to compute oil temperature according to a number of input signals depending upon computed values of true air speed $V_t$, altitude $h$, outside air temperature OAT, and brake horsepower BHP, and depending upon the operation of the oil cooling simulating apparatus. The effect of oil cooler flap operation is introduced into the computation of oil temperature by means of the oil cooler flap servo ($f_{oc}$) bearing the reference character 2. The other factors are introduced by apparatus including the true air speed servo ($V_t$) which is designated by reference character 3, the altitude amplifier 4, the altitude servo ($h$) designated by reference character 5, the outside air temperature summing amplifier 6, and the brake horsepower amplifier 7.

The true air speed servo ($V_t$) and the altitude servo ($h$) are of similar construction and only one, namely the true air speed servo ($V_t$) is therefore shown in detail. Referring to the true air speed servo ($V_t$) as an example, such servo includes servo amplifier 8 to which is applied a number of control voltages, a motor 9 responsive to the amplifier output, a feed-back generator 10 driven by the motor 9 and a potentiometer 11 having its slider contact connected through a gear reduction box 12 to the motor generator combination. Servo amplifier 8 is a summing amplifier for determining the resultant of the input voltages and is of a type well-known in the art for algebraically summing a plurality of A. C. voltages of varying magnitude and polarity. A detailed circuit illustration is therefore unnecessary.

The servo motor 9 is of the two phase type, having a control phase 13 which is energized by the amplifier output, and another phase 14 which is energized by a constant reference A. C. voltage $e_1$ de-phased 90° from the control voltage. The operation of this type of motor is well-known, rotation being in one direction when the control and reference voltages of the respective phases have the same instantaneous polarity, and in the opposite direction when the instantaneous polarity of the control voltage is reversed with respect to the reference voltage, the rate of rotation in both cases depending the magnitude of the control voltage. The generator 10 which is driven by the servo motor is a two-phased generator having one phase 15 energized by a 90° de-phased reference voltage $e_2$, the other phase 16 generating according to the motor speed a feed-back voltage $e_{fb}$ for purposes of velocity control.

The potentiometer resistance element 11 of the true air speed servo ($V_t$) and other potentiometers shown in the drawings may be of the well-known card type and are of circular band form in practice, but are diagrammatically illustrated in plane developed for clarity. A structural arrangement which may be conveniently used for a servo motor and potentiometer combination of the character referred to is shown in Patent No. 2,341,749, issued December 2, 1947, to R. B. Grant for "Potentiometer Housing and Positioning Structure."

Potentiometer card 11 is provided with slider contact 17 which is positioned along the card by the servo motor which connects with the slider contact through the gear reduction box 12 and suitable mechanical connections 18. The slider contact derives, i. e. picks off potentiometer voltages depending upon the contact position and the potentiometer is shaped or contoured so that the derived voltages at the slider contact bears a certain relationship to linear movement of the contact depending upon the particular function of the potentiometer. The potentiometer has a voltage impressed across its terminals depending as to instantaneous polarity and magnitude according to the potentiometer function.

The true air speed servo ($V_t$) computes true air speed according to a number of input control signals which are determined by the operation of simulated aircraft controls in the trainer. The control signals for the true air speed servo ($V_t$) and the manner in which they are derived is indicated in a pending application of Robert G. Stern and Albert Joseph Sherman for "Flight Computing System," S. N. 436,532, filed June 14, 1954 (of even date), and assigned to the same assignee as the present invention. In accordance with the operation of the true air speed servo ($V_t$) the slider contact 17 is positioned along the potentiometer card 11 which as shown is energized at one end by a negative A. C. voltage —E and is connected to ground at its other end. A voltage is thereby derived at the slider contact 17, and such voltage is fed over line 19 to summing amplifier 2' of the oil temperature servo (OT) to provide input signal $-OT(V_t)$. The slider contact 17 is disposed at the grounded end of potentiometer card 11 when the true air speed is zero so that at such time input signal $-OT(V_t)$ to amplifier 2' is also zero, and the slider contact is disposed at the other end of the potentiometer card when true air speed attains a maximum value at which time input signal $-OT(V_t)$ has its maximum effect in determining the operation of the oil temperature servo $(V_t)$. Intermediate values of input signal $-OT(V_t)$ are obtained for intermediate positions of slider contact 17 on potentiometer card 11.

As has been stated, altitude is a factor in the determination of oil temperature and altitude amplifier 4 is provided for introducing the effect of altitude into the oil temperature computation. Altitude may be computed as shown in the aforesaid copending application of Robert G. Stern and Albert Joseph Sherman, S. N. 436,532, filed June 14, 1954, and assigned to the same assignee as the present invention, and a voltage derived which varies directly as the computed value of altitude. Such voltage may be amplified in the altitude amplifier 4 which as shown connects with the primary winding 20 of a transformer 21 having a secondary winding 22 which connects over line 23 with the oil temperature servo amplifier 2' to provide input signal $+OT(h)$ representing the effect of altitude on oil temperature due to a change in air density with increasing altitude. As the altitude of an aircraft increases, the air density decreases and the mass of air available for cooling is lessened. The air has less cooling effect and the oil temperature is therefore caused to rise assuming other conditions are unchanged. This phenomenon is taken into account by means of the signal $+OT(h)$, such signal being caused to increase as altitude increases and having the effect of increasing oil temperature as computed by the oil temperature servo (OT).

The effect of outside air temperature is computed by means of the OAT amplifier 6 which as shown connects with the primary 24 of a transformer 25 having a secondary winding 26 that has its output terminal connected over line 27 to the oil temperature servo amplifier 2' to provide input signal $+OT(OAT)$. An increase in outside air temperature as computed in amplifier 6 is reflected in an increase in oil temperature, whereas a decrease in the outside air temperature is reflected in a decrease in oil temperature as computed by the oil temperature servo (OT). Outside air temperature in the trainer is computed in amplifier 6 according to supposed weather conditions as prescribed by an instructor, and altitude flight. Weather is taken into account by means of potentiometer 28 energized at opposite ends by A. C. voltages $+E$ and $-E$ respectively and having a slider contact 29 which is positionable by an instructor. A voltage derived at slider contact 29 according to the supposed weather is fed over line 30 to provide one input signal to amplifier 6. The amplifier has one other input signal which is derived at slider contact 31 of potentiometer 32 which input signal is fed over line 33 to the OAT summing amplifier to introduce the effect of altitude, the slider contact 31 being positioned along the potentiometer 32 according to the operation of the altitude servo $(h)$. The potentiometer card 32 is energized at one end by the negative A. C. voltage $-E$ and connects near its other end through a resistor 34 to ground. The slider contact 31 of potentiometer 32 is at the end of the potentiometer energized by the A. C. voltage $-E$ when the computed value of altitude corresponds to the altitude at sea level whereas a position for slider contact 31 farther up the card 32 indicates a greater altitude the magnitude of which is indicated by the particular position of the contact on the card.

A signal determined according to the operation of means (not shown) for computing brake horsepower is amplified in the line amplifier 35 which connects to the primary 36 of a transformer 37 having a secondary winding 38. The positive output terminal of winding 38 connects over lines 39 and 40 with oil temperature servo amplifier 2 to provide input signal $+OT(BHP)$ which introduces the effect of brake horsepower into the computation of oil temperature. Brake horsepower may be computed by means shown in the pending application of Robert G. Stern, William H. Dawson and Clinton H. Havill, S. N. 436,328, filed June 14, 1954 (of even date), and assigned to the same assignee as the present invention.

As hereinbefore stated, oil temperature in the aircraft is dependent upon operation of the oil cooler flap. In the trainer, operation of the oil cooler flap is simulated in the oil cooler flap servo $(f_{oc})$, and the effect of its operation is introduced into the computation of oil temperature. The oil cooler flap servo $(f_{oc})$ which is controlled in the manner hereinafter explained, includes the servo amplifier 40' and motor 41 which positions a slider contact 42 along a potentiometer card 43. The potentiometer card 43 connects over line 44 and line 39 with the output terminal of secondary winding 38 of transformer 37. The potentiometer card is energized in this manner at one end according to the computed value of brake horsepower, the other end of the card being connected to ground. A voltage is derived at slider contact 42 connecting with the oil temperature servo amplifier 2' over line 43 to provide input signal $+OT(BHP), f_{oc})$ which introduces the effect of oil cooler flap position into the computation of oil temperature, such signal wherein flap position is taken into account being a function of the product of brake horsepower and flap position. A position of slider contact 42 at the lower end of card 43 as viewed in the drawing corresponds to a closed position for the oil cooler flap whereas a position of the slider contact farther up along the card indicates that the oil cooler flap is at least partially open. Of course, the greater the extent to which the oil cooler flap is opened the lower the temperature, assuming other conditions are unchanged.

All of the various input signals to the oil temperature servo amplifier 2' have been considered except the signals $-OT(ANS)$ and $e_{fb}$ which respectively represent an answer signal and a feed-back signal. The answer signal $-OT(ANS)$ is derived as shown at the slider contact 54 of potentiometer 55 which is energized at one end by the negative voltage $-E$ and connects through resistor 56 to ground at the other end, the slider contact 54 being positioned along the card according to the operation of the servo. The feed-back signal $e_{fb}$ is a signal from the amplifier 2 rather than from a feed-back generator which has been eliminated in the oil temperature servo (OT). The feed-back generator has also been eliminated from the oil cooler flap servo $(f_{oc})$, however, the oil temperature servo and the oil cooler flap servo are in all other respects similar to the other servos in the system. The various input signals to the oil temperature servo amplifier 2' as determined in the manner hereinbefore explained, when summed in amplifier 2' are determinative of oil temperature. The oil temperature servo is operated according to such signal to position a contact 57 of a potentiometer, 58 which is energized at one end by a D. C. voltage $+E$ (D. C.) and is connected at its other end to ground, and thereby derive a voltage signal at the slider contact representing oil temperature. Such voltage signal is fed over line 58 to a voltmeter 59 for registering oil temperature.

The oil cooler flap servo $(f_{oc})$ is controlled according to the position of an oil cooler flap control switch 60 (Fig. 2) which simulates a switch used in the aircraft by a pilot for controlling oil cooler flap position. The control switch 60 is a four-position switch which may be disposed in an "off," "automatic," "close," or "open" position. When the switch is in the "open" position, the oil cooler flap open relay 61 is energized over a circuit extending from the positive D. C. voltage $+E$ (D. C.) over the relay coil, line 62, contact 60a, line 61 including circuit breaker 62, and switch contact 63b to ground, assuming the D. C. power switch 64 is closed. Contact 65b of relay 61 is closed and the oil cooler flap servo amplifier 40' is energized over a circuit extending from the positive A. C. voltage +E over contact 66b lines 67 and 68, contact 65b and line 69 causing the oil cooler flap servo to be operated in a direction such that the input signal +OT(BHP, $f_{oc}$) to the oil temperature servo (OT) is decreased assuming a constant brake horsepower. Such operation of the oil cooler flap servo corresponds to opening the oil cooler flap in the aircraft, the effect being to reduce oil temperature. When the oil cooler flap servo is operated to a position corresponding to a fully open position for the oil cooler flap in the aircraft, contact 66b is opened by cam 70 which is connected by mechanical connections 71 to the servo motor 41 and contact 66a is closed thereby connecting the servo amplifier to ground. Accordingly the oil cooler flap servo ($f_{oc}$) is maintained in the position corresponding to the fully opened position of the flap until the control switch position is changed.

If the control switch 60 is moved to the "close" position thereby opening contact 60a and closing contact 60b the energizing circuit for the oil cooler flap open relay 61 is opened at contact 60a so that contact 65b opens and contact 65a closes, whereas an energizing circuit for the oil cooler flap close relay 72 is completed at 60b causing relay 72 to pick up and close the contact 73b. The energizing circuit for the oil cooler flap close relay 72 extends from the D. C. voltage +E (D. C.), over the relay coil, line 74, contact 60b, line 61 including circuit breaker 62 and contact 63b to ground with power switch 64 closed. With contact 73b of relay 72 closed and contact 65a of relay 61 closed servo amplifier 2 is energized over a circuit extending from the negative A. C. voltage —E over contacts 75b, lines 76 and 77, contact 73b, connection 78, contact 65a, and line 69 to the amplifier whereby the oil cooler flap servo is caused to operate in a direction corresponding to the closing of the oil cooler flap. By reason of the operation of the oil cooler flap servo the input signal +OT(BHP, $f_{oc}$) to the oil temperature servo (OT) is increased assuming that the brake horsepower remains constant. When the oil cooler flap servo has been operated to a position corresponding to a fully closed position for oil cooler flap, the energizing circuit for amplifier 40' is opened at contact 75b by means of the cam 76 which connects by mechanical connections 71 to servo motor 41. Contact 75a is closed thereby connecting the servo amplifier 40 to ground and the oil cooler flap servo is maintained in the fully closed position until the control switch 60 is re-positioned.

Assuming the control switch is moved to the "automatic" position contact 60b opens to effect the deenergization of relay 72 whereupon relay contact 73b opens and contact 73a closes, and contact 60c closes to bring about the energization of the oil cooler flap automatic relay 79 and the closing of contact 80b. The energizing circuit for the relay 79 extends from the positive D. C. voltage +E (D. C.) over the relay coil, line 81, contact 82a assuming the instructor's switch 83 is in a normal position, connection 84, contact 60c, line 61, including circuit breaker 62, and contact 63b to ground provided power switch 64 is closed. With contact 80b of relay 79 closed and contacts 73a and 65a of relays 72 and 61 also closed the servo amplifier 40' is connected with slider contact 85 of a potentiometer 86 in the oil temperature servo system over line 87 contact 80b, connection 88, contact 73a, connection 78, contact 65a and line 69. The potential at slider contact 85 and therefore the input signal to the servo amplifier 40' is dependent upon the position of the contact on the card as determined by the operation of the oil temperature servo (OT).

The potentiometer card 86 connects near one end through resistor 89, over line 90, line 67 and contact 66b with the positive A. C. voltage +E provided the oil cooler is not in the extreme position corresponding to the fully opened position of the oil cooler flap, and the potentiometer connects near its other end through resistor 91 over line 92, line 76, and contact 75b with the negative A. C. voltage —E provided the oil cooler flap servo is not in the extreme position corresponding to the fully closed position of the oil cooler flap. As shown, potentiometer card 86 is connected to ground midway between the energized points. As has been stated the position of the slider contact 85 on the potentiometer card 86 is dependent upon the operation of the oil temperature servo (OT). A position for the slider contact at the grounded point of potentiometer 86 corresponds to a computed oil temperature of a predetermined amount as for example 80° C., representing a desired temperature level for engine oil.

When oil temperature exceeds the desired temperature of 80° C., slider contact 85 is disposed along the upper portion of potentiometer card 86 so that the potential at slider contact 85 is positive and in consequence the oil cooler flap servo amplifier 40' is provided with a positive input signal so that the oil cooler flap servo ($f_{oc}$) operates in a direction such that the input signal +OT(BHP), $f_{oc}$) to the oil temperature servo amplifier 2 is decreased, such operation corresponding to opening the oil cooler flap. The oil temperature servo (OT) is operated to reflect a decrease in temperature whereupon the slider contact 85 of potentiometer 86 is moved to the grounded midpoint at which position the potential at slider contact 85 is the ground potential and the oil cooler flap servo ($f_{oc}$) ceases its operation. When oil temperature as computed by the oil temperature servo (OT) is less than the desired 80° C. level the slider contact 85 is disposed along the lower portion of potentiometer 86 and the potential at the slider contact is negative so that the oil cooler flap servo ($f_{oc}$) operates in a direction such that the input signal +OT(BHP, $f_{oc}$) to the oil temperature servo amplifier 2 is increased, such operation corresponding to a closing of the oil cooler flap. The oil temperature servo (OT) operates to reflect an increase in temperature and the slider contact 85 of the potentiometer 86 is moved to the grounded midpoint at which position the oil cooler flap servo ($f_{oc}$) ceases its operation. When the slider contact attains such a position on the card the oil temperature indicator 59 registers a desired oil temperature of 80° C.

It is to be noted that the potential at the slider contact 85 of potentiometer 86 decreases in magnitude as the slider contact approaches the grounded midpoint due to an increase or decrease in computed oil temperature. As a result, the speed of servomotor 41 of the oil cooler flap servo ($f_{oc}$) is caused to decrease so that the input signal +OT(BHP, $f_{oc}$) to the oil temperature servo amplifier changes slowly as the desired temperature level is reached. By suitably selecting potentiometer 86 and the resistors 89 and 91 associated therewith, the motor speed as slider contact 85 is moved along the card 86 may be predetermined to prevent any overshooting of the oil temperature servo.

When the oil cooler flap control switch 60 is in the "off" position, the oil cooler flap "open," "close" and "automatic" relays are de-energized, their energizing circuits being open at contacts 60a, 60b, and 60c respectively. Contacts 65a, 73a and 80a of the relays 61, 72 and 79 are therefore closed and the oil cooler flap servo amplifier 40 is connected with ground over the circuit including contact 80a, connections 88, contact 73a, connection 78, contact 65a, and line 69 so that the oil cooler flap servo remains inoperative in the position it occupied before the switch was placed in the "off" position.

As has been hereinbefore indicated, automatic operation is initiated by placing the control switch in the "automatic" position to energize the oil cooler flap automatic relay 79. It is to be noted that the energizing circuit for relay 79 includes the contact 82a of the instructor's switch 83. Normally switch 83 occupies a position such that the contact 82a is closed to provide for the energization of relay 79 when switch 60 is in the "automatic" position, however, the switch may be operated by an instructor to a fail position opening contact 82a whereupon the relay 79 is deenergized and the relay contact 80b opens to cease automatic operation. Operation of the switch 83 to a fail position provides additional training for the operator of the apparatus in that he must revert to automatic control by re-positioning the control switch 60 in the "open" or "close" position in order to maintain control of the oil temperature.

It should be understood that this invention is not limited to specific details of construction and arrangement thereof herein illustrated, and that changes and modifications may occur to one skilled in the art without departing from the spirit of the invention.

What is claimed is:

1. In aircraft training apparatus having flight computing means responsive to the operation of simulated controls, the combination of an oil temperature servo; an indicator controlled by said oil temperature servo to register oil temperature; means for simulating the operation of a flap for controlling the flow of air through an oil cooler; said oil temperature servo being operated according to computed flight conditions affecting oil temperature and according to the operation of the oil cooler flap simulating means; the oil cooler flap simulating means including an oil cooler flap control switch, an oil cooler flap servo, and means for controlling the operation of the oil cooler flap servo according to the position of said switch and according to the operation of the oil temperature servo; the means for controlling the operation of the oil cooler flap servo including a potentiometer energized by voltages of opposite polarity having a slider contact positioned along the potentiometer card according to the operation of the oil temperature servo, and means connecting said slider contact and the oil cooler flap servo in one position of the oil cooler flap control switch for providing the oil cooler flap servo with a continuous signal according to position of the slider contact whereby said oil cooler flap servo is caused to operate in a direction to increase or decrease registered oil temperature according to whether registered oil temperature is less or greater than a pre-determined amount.

2. In aircraft training apparatus having flight computing apparatus responsive to the operation of simulated controls, the combination of an oil temperature servo; an indicator controlled by said oil temperature servo to register oil temperature; means for simulating the operation of a flap for controlling the flow of air through an air cooler; means providing an input signal to the oil temperature servo representing the effect of outside air temperature on oil temperature, means providing an input signal to the oil temperature servo representing the effect of altitude on oil temperature, means providing an input signal to the oil temperature servo representing the effect of airspeed on oil temperature, means providing an input signal to the oil temperature servo representing the effect of brake horsepower on oil temperature and means providing another input signal to the oil temperature servo representing the product of brake horsepower and oil cooler flap position as determined by the oil cooler flap simulating means; the input signals to the oil temperature servo causing said oil temperature servo to operate so as to compute oil temperature.

3. In aircraft training apparatus having computing means responsive to the operation of simulated controls, the combination of an oil temperature servo; an indicator controlled by said oil temperature servo to register oil temperature; means for simulating the operation of a flap for controlling the flow of air through an oil cooler; the oil temperature servo being operated according to computed flight conditions affecting oil temperature and according to the operation of the oil cooler flap simulating means; said oil cooler flap simulating means comprising an oil cooler flap control switch positionable in an open, closed, automatic or off position, an oil cooler flap servo, means for causing said servo to operate in one direction with the control switch in said open position, means for causing the servo to operate in the other direction with the control switch in the closed position, and means for causing said servo to operate in one direction or the other with the control switch in the automatic position according to whether registered oil temperature is less or greater respectively than a predetermined amount to thereby affect an increase or decrease respectively in registered oil temperature; the means for causing the oil cooler flap servo to operate in one direction or the other with the control switch in the automatic position including a potentiometer energized by voltages of opposite polarity having a slider contact positioned along the potentiometer card according to the operation of the oil temperature servo and means connecting said slider contact and the oil cooler flap servo in the said automatic position of the oil cooler flap control switch for providing the oil cooler flap servo with a continuous signal according to the position of the slider contact whereby said oil cooler flap servo is caused to operate in a direction to increase or decrease registered oil temperature according to whether registered oil temperature is less or greater than a pre-determined amount.

4. In aircraft training apparatus having flight computing means responsive to the operation of simulated controls, the combination of an oil temperature servo; an indicator controlled by said oil temperature servo to register oil temperature; means for simulating the operation of a flap for controlling the flow of air through an oil cooler; said oil temperature servo being operated according to computed flight conditions affecting oil temperature and according to the operation of the oil cooler flap simulating means; the oil cooler flap simulating means including an oil cooler flap control switch, an oil cooler flap servo, and means for controlling the operation of the oil cooler flap servo according to the position of said switch and according to the operation of the oil temperature servo; the means for controlling the operation of the oil cooler flap servo including signal deriving means controlled according to the operation of the oil temperature servo and connected to the oil cooler flap servo in one position of the oil cooler flap control switch for providing the oil cooler flap servo with a continuously variable signal according to the operation of the oil temperature servo whereby said oil cooler flap servo is caused to operate in a direction to increase or decrease registered oil temperature according to whether registered oil temperature is less or greater than a pre-determined amount.

References Cited in the file of this patent

UNITED STATES PATENTS

| | | |
|---|---|---|
| 2,496,617 | Burelbach | Feb. 7, 1950 |
| 2,506,949 | Burelbach et al. | May 9, 1950 |
| 2,554,155 | Rippere | May 2, 1951 |